United States Patent Office 3,115,950
Patented Dec. 31, 1963

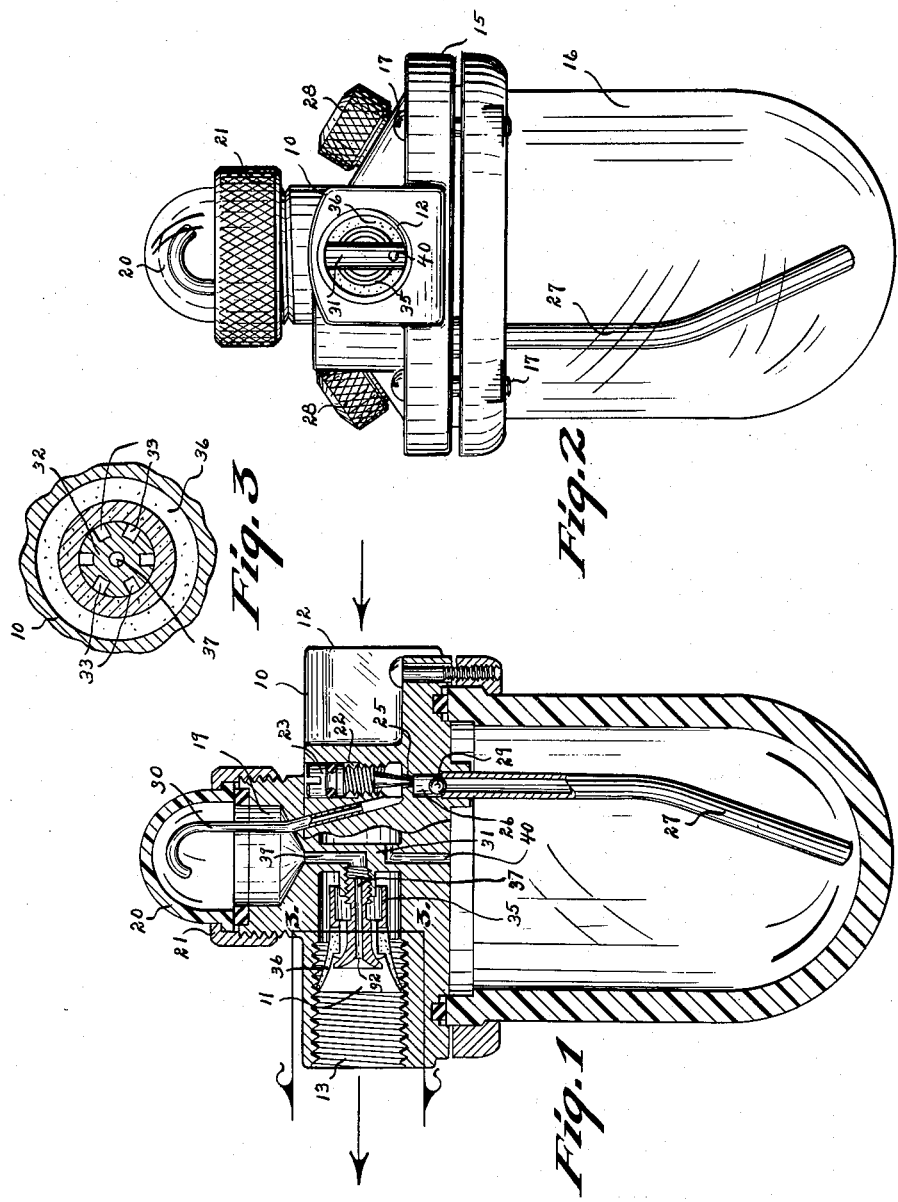

3,115,950
MEANS FOR INJECTING AN OIL INTO AN AIR STREAM
Jerry P. Malec, Omaha, Nebr., assignor to Comet Industries, Inc., Omaha, Nebr., a corporation of Nebraska
Filed Jan. 2, 1962, Ser. No. 163,488
7 Claims. (Cl. 184—55)

This invention relates to air line oilers and more particularly to an air conduit oiler that is adjustable, automatic in operation, and observable during operation.

The use of a source of air under pressure to actuate pneumatic tools, equipment, and like, is well known. The advantages are that the air power means is of light weight, fire hazard is eliminated, and noise level is reduced to a minimum. However, it is most difficult to oil or keep the tools, equipment or like oiled, that are being actuated by the air force. Attempts have been made to introduce oil directly into the air stream thus automatically lubricating the moving parts of the tools or equipment. Such devices, however, usually either seriously drop the air pressure at point of use, produce too much back pressure, or only operate intermittently when the air pressure flow is affected by the intermittent use of the air flow. In the first instance much efficiency is lost and in the latter instance some equipment would get too much oil, while other equipment using a substantially constant air stream would get little if any oil. Also, some tools, such as staplers, using only minimum air power would never be properly lubricated. Some oilers do have adjustable valve means. However, the chief objection is that one cannot observe visibly the amount of oil being fed to the equipment and therefore any adjustment would be a mere guess.

Therefore, one of the principal objects of my invention is to provide an oiler means for air conduits that provides visible observation as to the amount of oil being injected into the air stream.

A further object of this invention is to provide a means for injecting an oil into an air stream that has a relatively large oil reservoir, thereby eliminating frequent refilling.

A still further object of this invention is to provide a simple inexpensive air line oiler that functions continuously during the passage of the air stream to which it is associated.

A further object of this invention is to provide an air conduit oiler that does not materially reduce the air pressure stream passing from it.

A still further object of this invention is to provide an automatic oiler for an air pressure stream that introduces oil into the air stream without the air passing through the oil compartment.

A still further object of this invention is to provide an air conduit oiler that introduces the oil into the air stream in the form of an oil film.

A still further object of this invention is to provide an oiler for air lines that is easily observable as to both its function and its oil supply.

Still further objects of my invention are to provide an air line oiler that is capable of adjustment to compensate for various grades of oil, various air pressures, and various air volume usage.

Still further objects of this invention are to provide an air line oiler that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side sectional view of my device;

FIG. 2 is an end view of my oiler and more fully illustrates its construction; and FIG. 3 is an enlarged cross-sectional view taken on line 3—3 of FIG. 1.

As herebefore indicated, my oiler unit is adapted to be imposed in an air pressure conduit (not shown). The numeral 10 generally designates the head or base portion of the device. Extending longitudinally and completely through the base 10 is a bore 11. The threaded end 12 of this bore is to receive the inlet end of an air pressure conduit pipe, and its threaded end 13 is to receive the outlet air pressure conduit pipe. The lower portion 15 of the base 10 is circular, and the transparent oil reservoir bowl 16 is detachably secured thereon by the cap screws 17. In the upper portion of the base 10 is a well cavity 19. This well 19 has its top enclosed by a transparent dome 20 detachably secured to the upper portion of the base 10 by the nut ring 21. In the side area of the base 10 is a small well 22. Threaded downwardly in this well 22 is an adjustable needle valve 23, having its pointed end extending into the tapered valve seat 25. In the base 10 and communicating with the bottom of valve seat 25 is a valve compartment 26. The numeral 27 designates a pipe having one end communicating with the inside bottom area of the bowl 16 and its other end communicating with the inside bottom of the compartment 26. The numeral 29 designates a ball check valve in the compartment 26 as shown in FIG. 1. The numeral 30 designates a pipe having its lower end communicating with the lower end of the small well 22. This small conduit pipe extends upwardly within the dome 20 and has its upper end portion curved to extend downwardly as shown in FIG. 2. The oil or like lubricant to be injected into the air stream is placed in the bowl 16 through the filler cap 28. The numeral 31 designates a vertical post extending through the central area of the bore 11. The numeral 32 designates a venturi core having its rear end operatively detachably threaded onto the post 31 and its forward portion in the form of a funnel cone as shown in FIG. 1. The funnel cone end portion flares outwardly and forwardly as shown in FIG. 1, and the outside of this venturi core has a plurality of longitudinally extending grooves 33. Fixed around the venturi core portion 32 is a collar 35. This collar is open at both ends, has a diameter greater than that of the core 32 back of the grooves 33, and is of a diameter less than that of the bore 11. By this arrangement of parts, air may pass into the threaded end 12 of the device, past the post 31 and then pass both to the inside and outside of the open collar 35. The air that passes through the inside of the collar 35 will pass outwardly through the grooves 33. Embracing the forward end portion of the core 32 is an outwardly and forwardly flared skirt 36. This skirt has its rear end portion embracing the groove area of the venturi core and then extends outwardly and forwardly in spaced relationship to the forward end of the venturi core as shown in FIG. 1. In order that this flared skirt portion will be automatically responsive to air velocities and volume, it is made of flexible resilient material such as rubber or like. By being of such flexible resilient material the venturi suction means would automatically compensate for various air velocities passing through the device. Furthermore, the greater the volume of air passing through the device, the less the obstruction the venturi suction means will be. However, with a relatively small volume of air passing through the unit most, if not all, will pass through the grooves 33 and the suction action of the venturi means will be most efficient even at such low volumes. However, if a great amount of air is passing through the bore 11 some of the air will pass to the outside of the collar 35, bend the flexible resilient skirt inwardly and pass freely directly outwardly from the device. When the air pressure drops, the flexible resilient skirt 36 will yieldingly spread outwardly to engage the inside periphery of the bore 11, and thus cause the small volume of air to pass into and through the collar 35. The flared end of the venturi core will obviously produce a minus pressure at the center of the forward end of the core. This forward end of the core communicates with the inside passageway 37 of the venturi core. The numeral 39 designates a passageway in the post 31 having one end communicating with the rear end of the passageway 37 and its other end communicating with the inside bottom of the well 19. By this arrangement of parts the minus pressure at the forward end of the venturi core will produce also a minus pressure within the dome 20. This minus pressure will suck oil or like upwardly through the member 27, past the ball check valve 29, through the valve seat 25 and thence through the small pipe conduit 30. Inasmuch as the dome 20 is transparent the operator will be able to observe the amount of oil dropping from the upper end of the pipe 30. These drops of oil will pass downwardly into the well 19, through the passageways 29 and 27 and thence outwardly in the form of a film on the front end of the flared portion of the venturi core 32. Upon reaching the outer periphery edge of the forward end of the venturi core, the film of oil will pass into the air stream as it passes through the end 13 of the head. The amount of oil passage into the air stream will be relative to the volume of air passing through the device. However, the ratio of oil to the volume of air may be adjustably regulated by the needle valve 23. Obviously, the pressure inside the bowl 16 must be equalized with that of the air pressure passing through the device and the same is accomplished by passageway 40 having one end communicating with the inside top of the bowl 16 and its other end communicating with the bore 11, as shown in FIG. 1. The amount of oil within the bowl reservoir 16 may be determined by merely looking into the bowl 16 which is of transparent material. The two principal features of my device are the resilient flexible skirt ring collar 36 and the transparent dome 20 which permits observation as to the amount of oil being fed into the air stream.

From the above it will be appreciated that my device will successfully uniformly inject an oil film into the air column and that this is accomplished without any substantial loss of air pressure at the point of use. Also, the device will cover a relatively broad range of air requirements without adjustment for varying air flows, temperature changes and oil characteristics. When my device is installed, oil will be introduced into the air stream only when air is passing through the device.

Some changes may be made in the construction and arrangement of my means for injecting an oil into an air stream without departing from the real spirit and purpose of my invention, and it is my intention to cover by my claims, any modified forms of structure or use of mechanical equivalents which may be reasonably included within their scope.

I claim:
1. In an air stream oil injecting device, comprising in combination,
   (a) a base portion having a bore through which air is adapted to flow,
   (b) a liquid compartment secured to said base,
   (c) a venturi core member inside the bore of said base, having a passageway operatively communicating with the inside of said liquid compartment and an extending flared end portion,
   (d) a longitudinal groove in the outer side of said core, and
   (e) a flexible flared skirt embracing that portion of said venturi core having the longitudinal groove and extending away from said venturi core into yieldable engagement with the inner peripheral surface of the said bore of said base portion.
2. In an air stream oil injecting device, comprising in combination,
   (a) a base portion having a bore through which air is adapted to flow,
   (b) a liquid compartment secured to said base,
   (c) a venturi core member inside the bore of said base, having a passageway operatively communicating with the inside of said liquid compartment and an extending flared end portion,
   (d) a plurality of spaced apart longitudinal grooves in the outer side of said core, and
   (e) a flexible flared skirt embracing that portion of said venturi core having the plurality of said spaced apart longitudinal grooves and extending away from said venturi core into yieldable engagement with the inner peripheral surface of the said bore of said base portion.
3. In an air stream oil injecting device,
   a base portion having a bore through which air is adapted to flow,
   a first liquid compartment secured to said base,
   a second liquid compartment secured to said base,
   a first conduit interconnecting said first and second liquid compartments,
   a venturi means secured within the bore of said base,
   a conduit connecting said venturi means to said second liquid compartment whereby when a minus pressure is created in said bore by air passing through said venturi means, any liquid in said first liquid compartment will be pulled through said first conduit, said second liquid compartment, and through said second conduit into the said bore of said base,
   a resilient collar member embracing the end of said venturi means through which air is normally discharged,
   said collar member extending from said venturi means to yielding engagement with the interior peripheral surface of said bore;
   said venturi means including at least one longitudinal groove whereby air can pass through said bore via the inside of said collar member as well as via the outside of said collar member.
4. The structure of claim 3 wherein at least a portion of said second liquid compartment is transparent.
5. The structure of claim 3 wherein said venturi means includes a core portion having one of its ends in a flared condition.
6. In an air stream oil injecting device,
   a base portion having a bore through which air is adapted to flow,
   a liquid compartment secured to said base portion,
   a venturi means secured within the bore of said base portion,
   a conduit connecting said venturi means to said liquid compartment whereby when a minus pressure is created in said bore by air passing through said venturi means, any liquid in said liquid compartment will be pulled through said conduit into the said bore of said base, a resilient collar member extending from said venturi means to yielding engagement with the interior peripheral surface of said bore, said venturi means including at least one longitudinal groove through which air can pass through said bore from one side of said collar member to the other.

7. The structure of claim 6 wherein said venturi mean includes a plurality of said longitudinal grooves.

References Cited in the file of this patent

UNITED STATES PATENTS

| | | |
|---|---|---|
| 2,661,814 | Norgren et al. | Dec. 8, 195 |
| 2,718,934 | Norgren et al. | Sept. 27, 195 |
| 2,921,649 | Wilkerson | Jan. 19, 196 |
| 2,945,560 | Malec | July 19, 196 |